United States Patent
Amano et al.

(10) Patent No.: US 7,167,880 B2
(45) Date of Patent: Jan. 23, 2007

(54) METHOD AND APPARATUS FOR AVOIDING JOURNAL OVERFLOW ON BACKUP AND RECOVERY SYSTEM USING STORAGE BASED JOURNALING

(75) Inventors: Takashi Amano, Sunnyvale, CA (US); Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 10/823,619

(22) Filed: Apr. 14, 2004

(65) Prior Publication Data
US 2005/0235016 A1    Oct. 20, 2005

(51) Int. Cl.
G06F 12/00 (2006.01)
G06F 17/30 (2006.01)
G06F 7/00 (2006.01)

(52) U.S. Cl. .............. 707/205; 707/201; 707/203; 707/204; 707/206; 707/10; 707/200

(58) Field of Classification Search ............ 707/10, 707/200, 201, 203, 204, 205, 206; 711/162, 711/202
See application file for complete search history.

(56) References Cited

U.S. PATENT DOCUMENTS

| | | | |
|---|---|---|---|
| 4,077,059 A | | 2/1978 | Cordi et al. |
| 4,823,261 A | | 4/1989 | Bank et al. |
| 5,086,502 A | | 2/1992 | Malcolm |
| 5,237,682 A | * | 8/1993 | Bendert et al. ............ 707/205 |
| 5,404,508 A | | 4/1995 | Konrad et al. |
| 5,857,207 A | * | 1/1999 | Lo et al. ..................... 707/203 |
| 5,860,137 A | * | 1/1999 | Raz et al. .................... 711/202 |
| 5,963,962 A | * | 10/1999 | Hitz et al. ................... 707/202 |
| 6,128,630 A | | 10/2000 | Shackelford |
| 6,189,016 B1 | | 2/2001 | Cabrera et al. |
| 6,289,356 B1 | * | 9/2001 | Hitz et al. ................... 707/201 |
| 6,301,677 B1 | | 10/2001 | Squibb |
| 6,324,654 B1 | | 11/2001 | Wahl et al. |
| 6,397,351 B1 | * | 5/2002 | Miller et al. .................. 714/13 |
| 6,415,372 B1 | * | 7/2002 | Zakai et al. ................ 711/165 |
| 6,442,706 B1 | | 8/2002 | Wahl et al. |

(Continued)

FOREIGN PATENT DOCUMENTS

JP    3103941    4/1991

(Continued)

*Primary Examiner*—Cam Y T Truong
*Assistant Examiner*—Brent Stace
(74) *Attorney, Agent, or Firm*—Mattingly, Stanger, Malur & Brundidge, P.C.

(57) ABSTRACT

A method and apparatus which provide solutions for avoiding journal overflow in after and before journal methods of a backup and recovery system used with a storage system. The after journal method solutions, which are conducted when the amount of free space reaches a threshold, include periodically taking a new snapshot and deleting the oldest journal, periodically taking a new logical snapshot and deleting the oldest journal, stopping the taking journal entries when the journal volume is full, and stopping the taking journal entries when the journal volume is full and then switching to bitmap management. The before journal method solution, which is conducted when the amount of free space reaches a threshold, includes applying wrap-around overwriting to overwrite the oldest journal entry by the newest journal entry.

15 Claims, 15 Drawing Sheets stop taking journal with bitmap

| U.S. PATENT DOCUMENTS | | | | |
|---|---|---|---|---|
| 6,886,035 B1 * | 4/2005 | Wolff | | 709/219 |
| 6,898,688 B1 * | 5/2005 | Martin et al. | | 711/202 |
| 6,981,114 B1 * | 12/2005 | Wu et al. | | 711/162 |
| 2002/0133491 A1 * | 9/2002 | Sim et al. | | 707/10 |
| 2004/0225689 A1 * | 11/2004 | Dettinger et al. | | 707/200 |

| FOREIGN PATENT DOCUMENTS | | |
|---|---|---|
| JP | 5002517 | 1/1993 |
| JP | 11353215 | 12/1999 |
| JP | 2000155708 | 6/2000 |

* cited by examiner

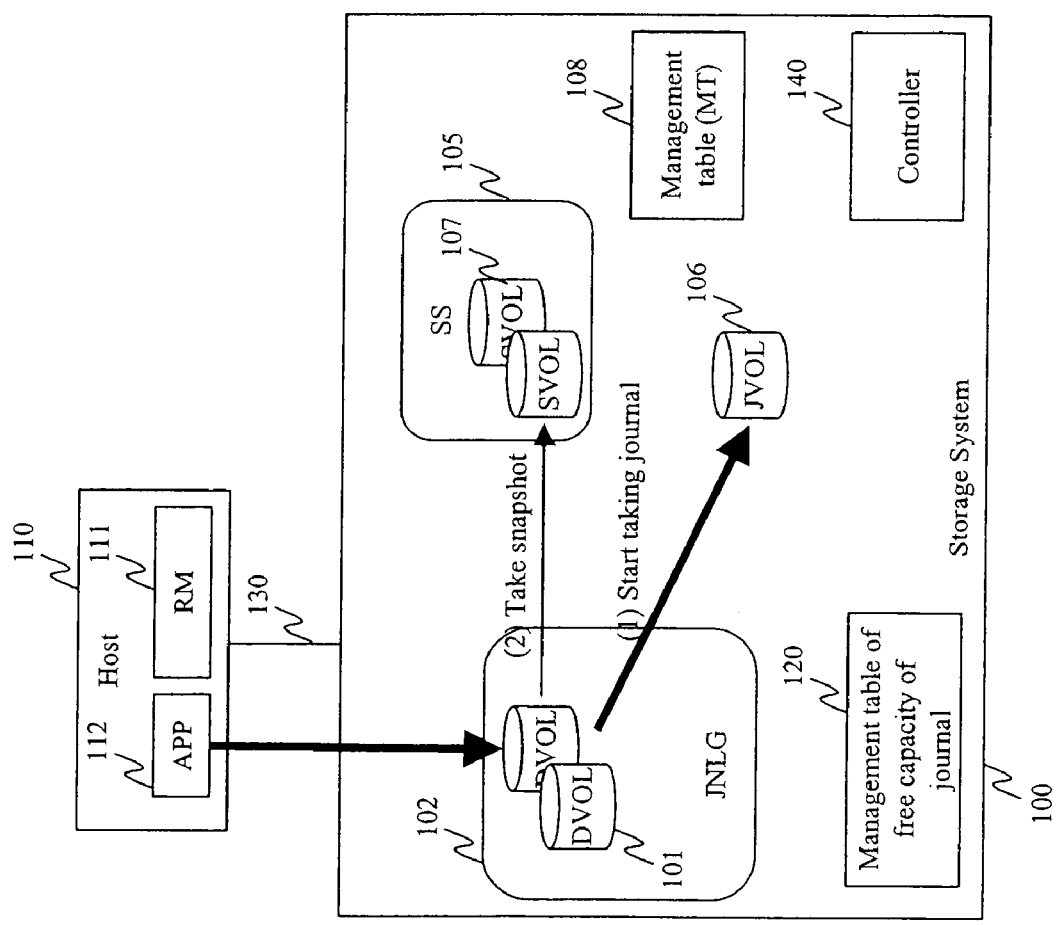
Fig. 1 : Overview of backup

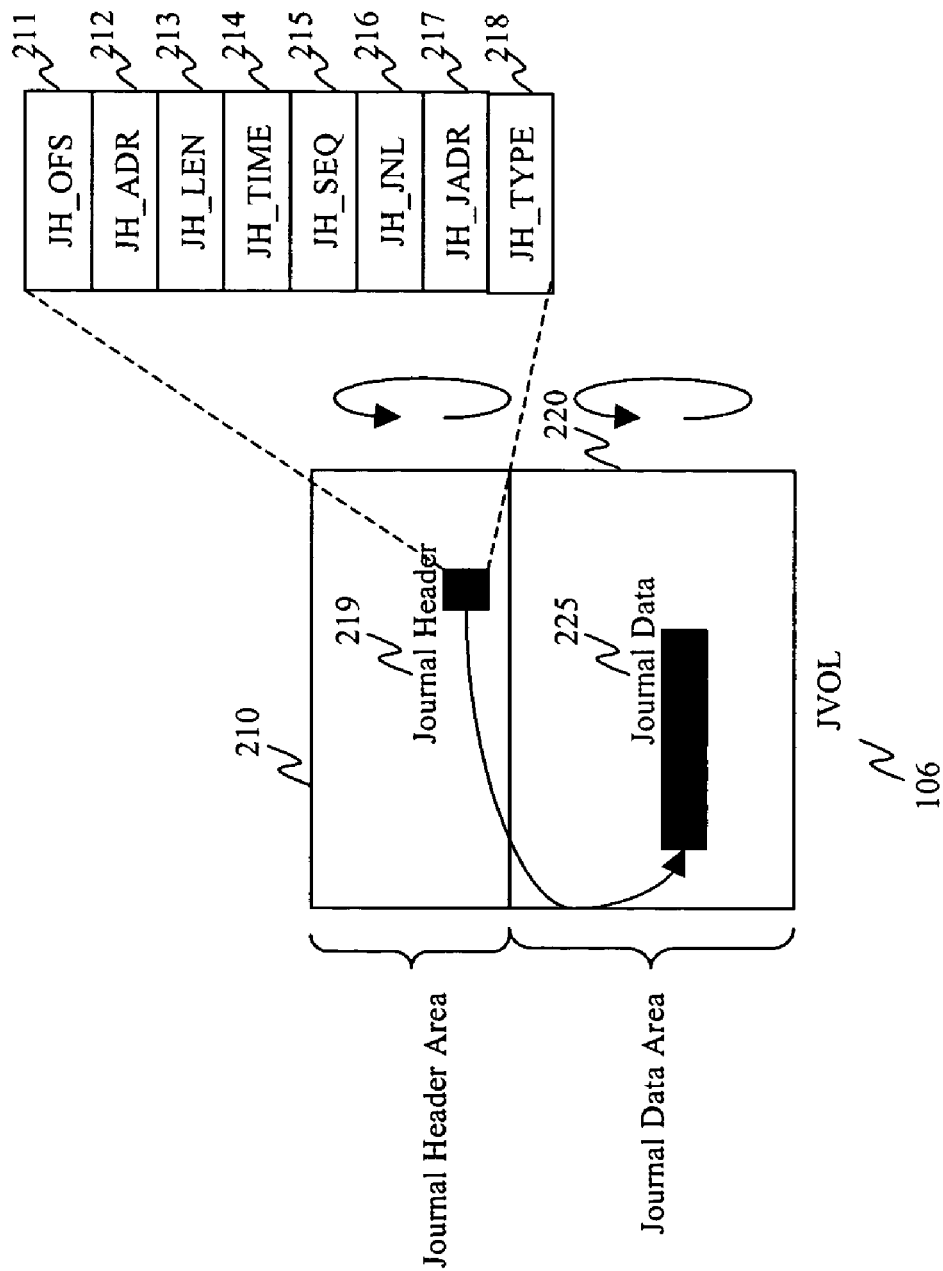
Fig. 2 : Control Data for Journal

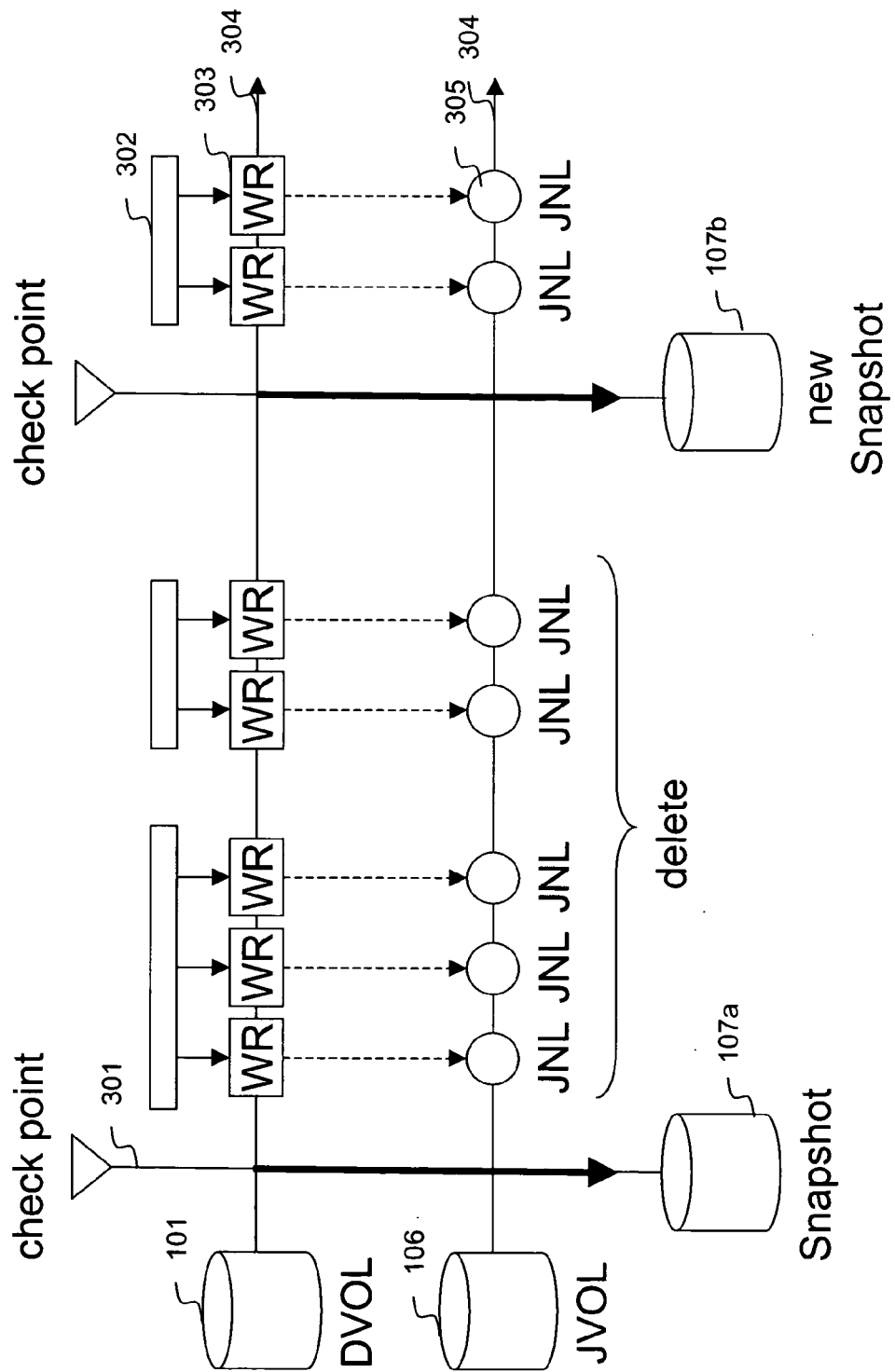
Fig. 3 : take a new snapshot

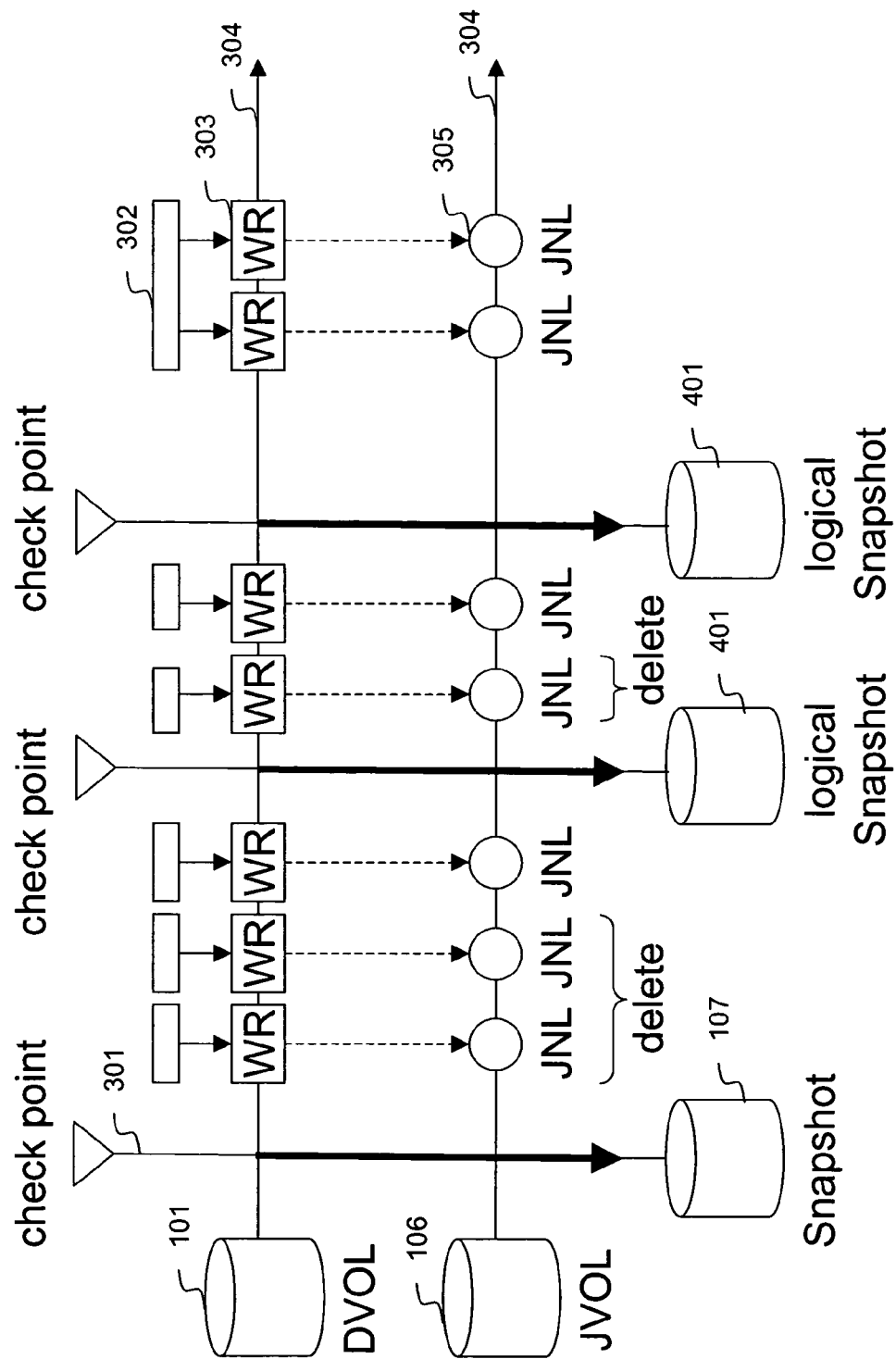
Fig. 4 : take a logical snapshot

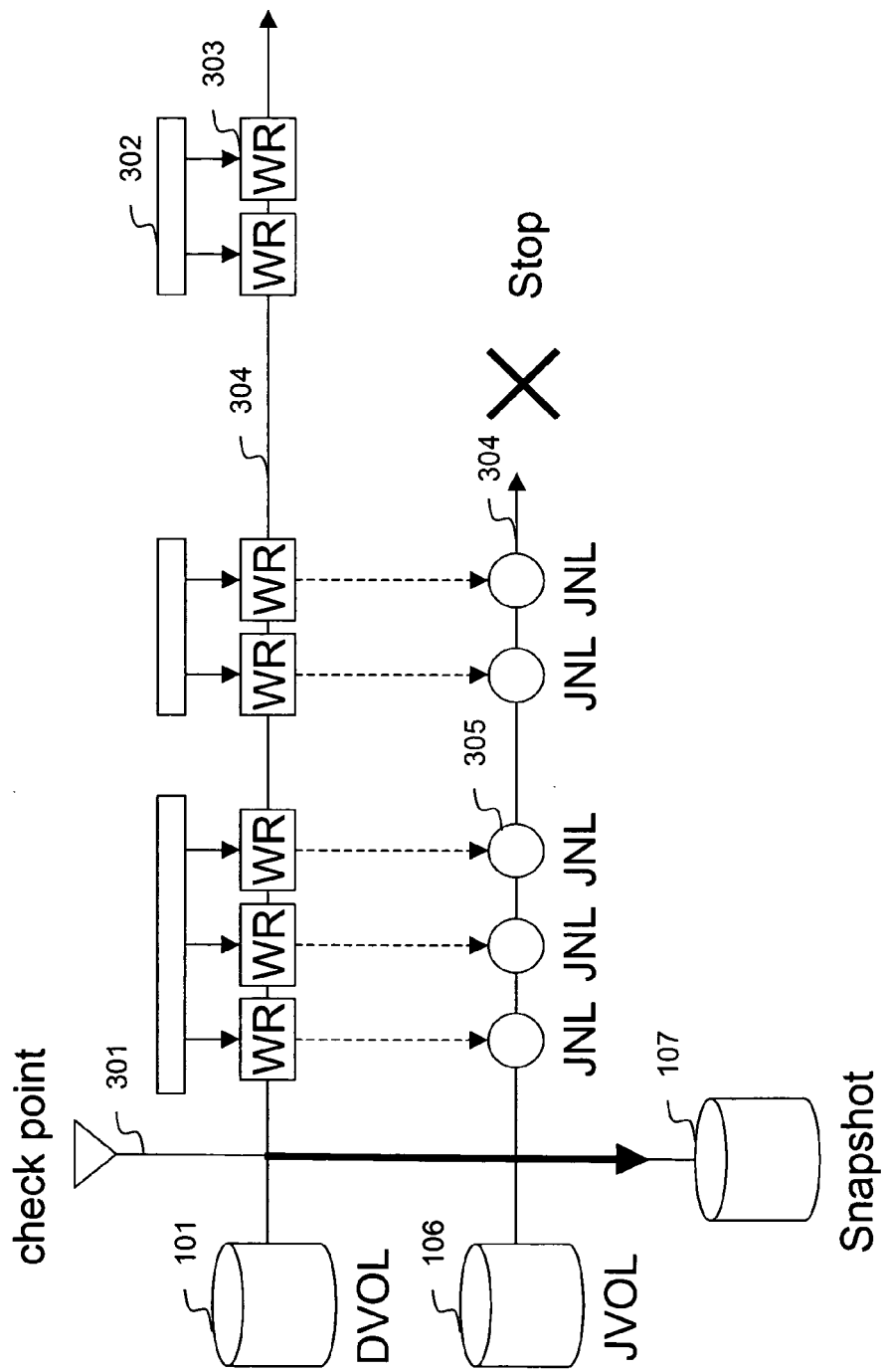
Fig. 5 : stop taking journal

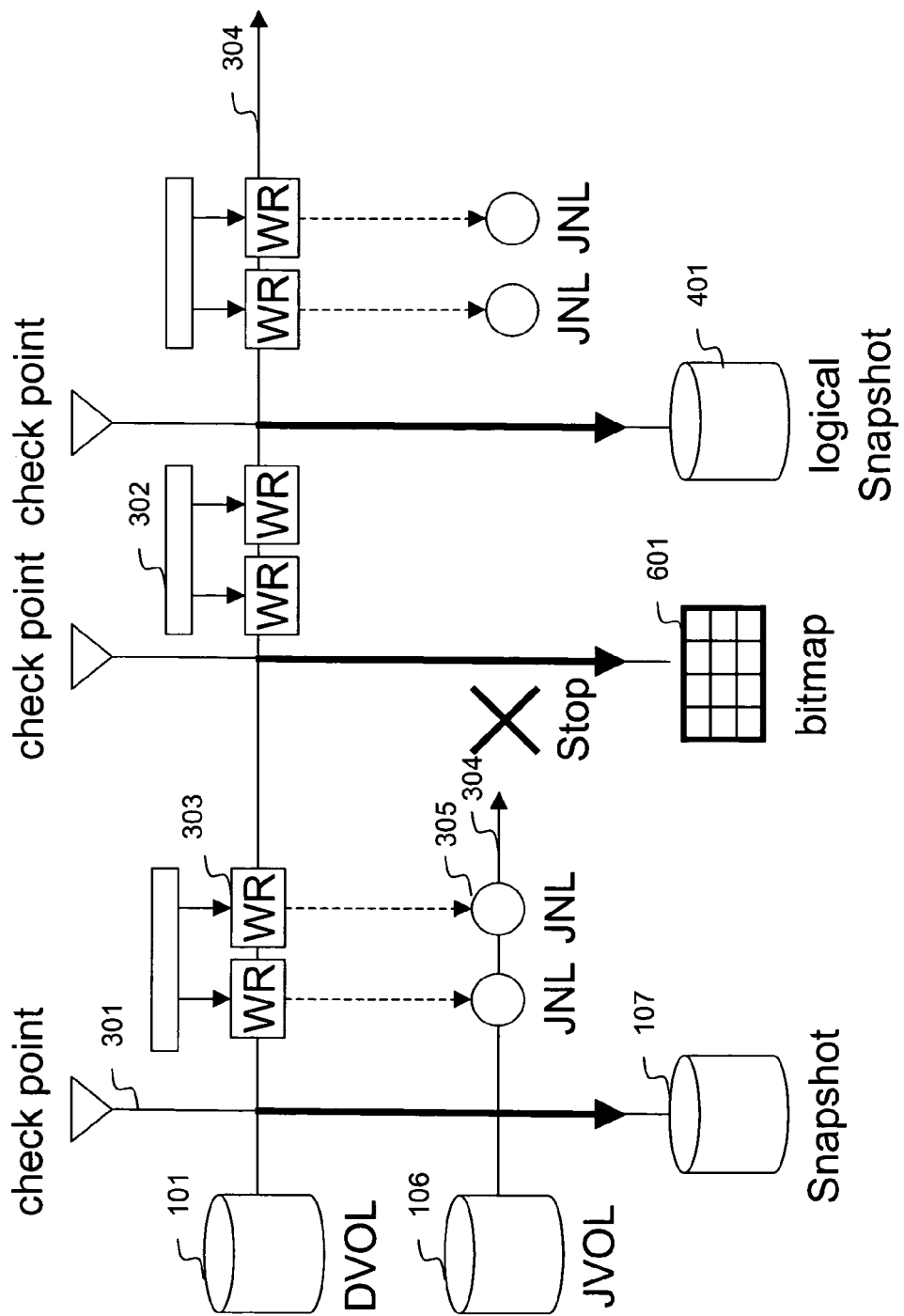
Fig. 6 : stop taking journal with bitmap

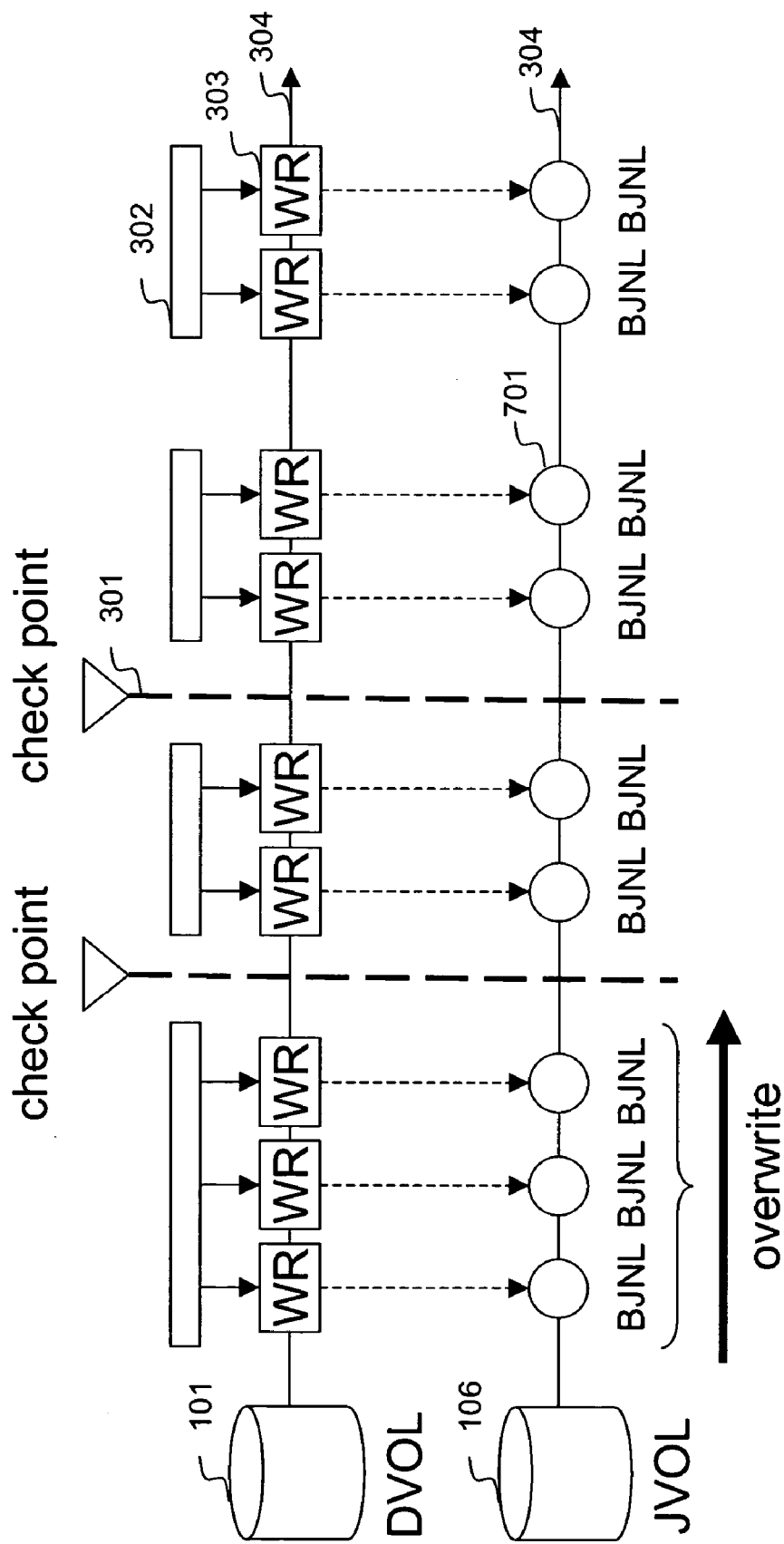
Fig. 7 : overwrite the oldest journal

| | free capacity of journal pool | threshold of free capacity | threshold of rate of free capacity | wrap-around |
|---|---|---|---|---|
| JNLG-A | 10GB(7%) | 1GB | - | - |
| JNLG-B | | - | 5% | - |
| JNLG-C | | 5GB | - | x |

Fig. 8 : management table of free capacity of journal

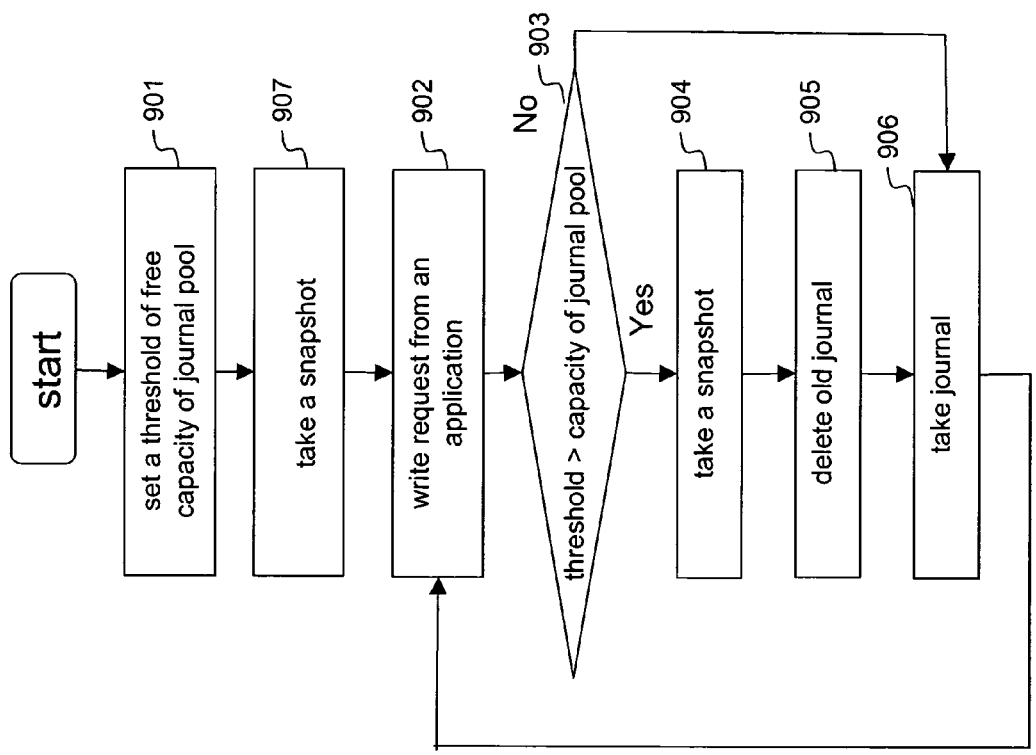
Fig. 9 : flowchart of Fig.3

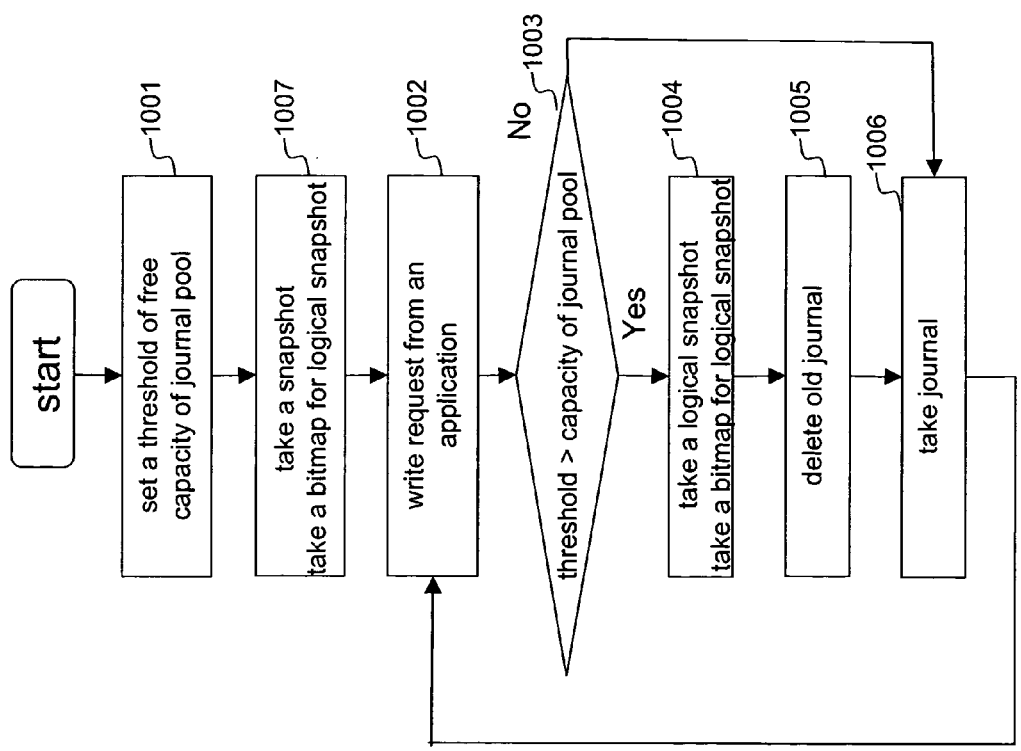
Fig. 10 : flowchart of Fig.4

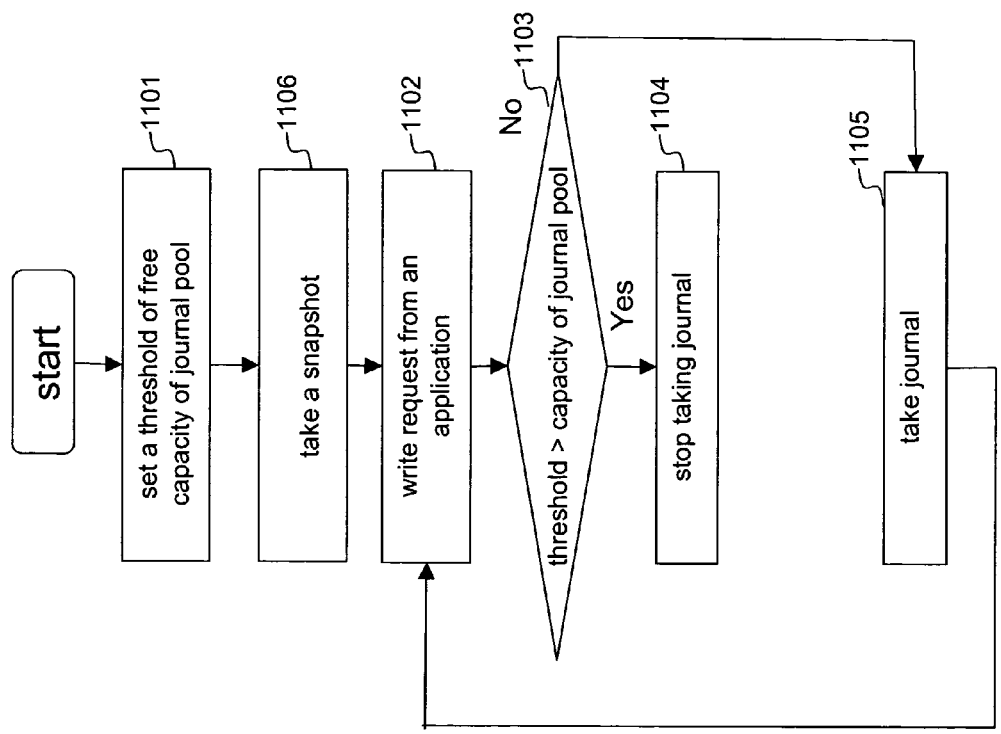
Fig. 11 : flowchart of Fig.5

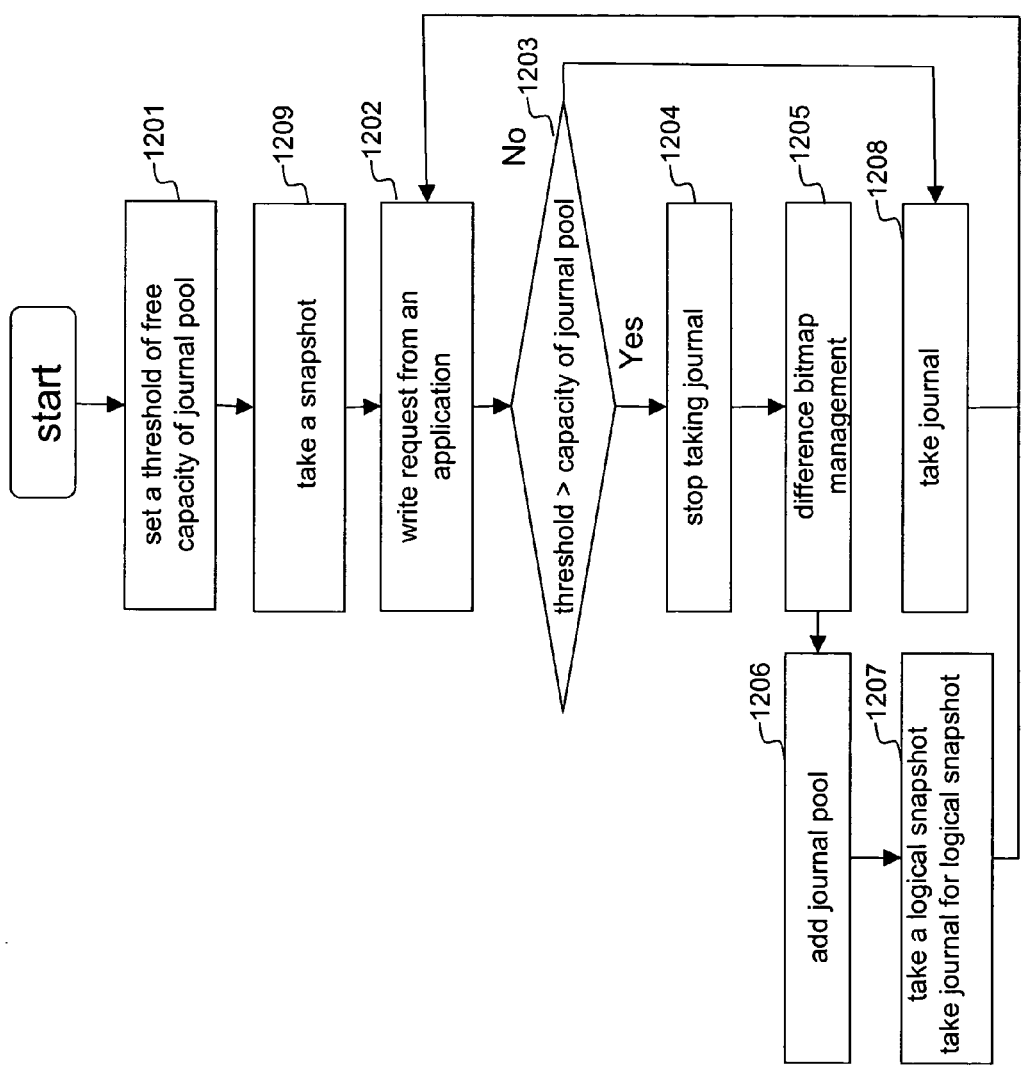
Fig. 12 : flowchart of Fig.6

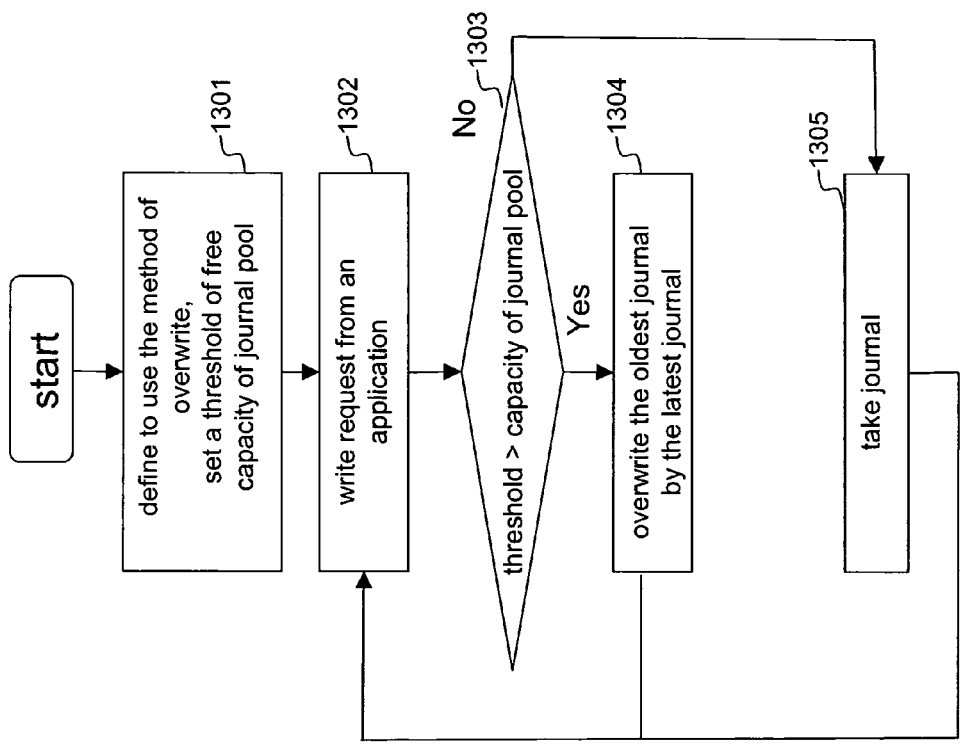
Fig. 13 : flowchart of Fig.7

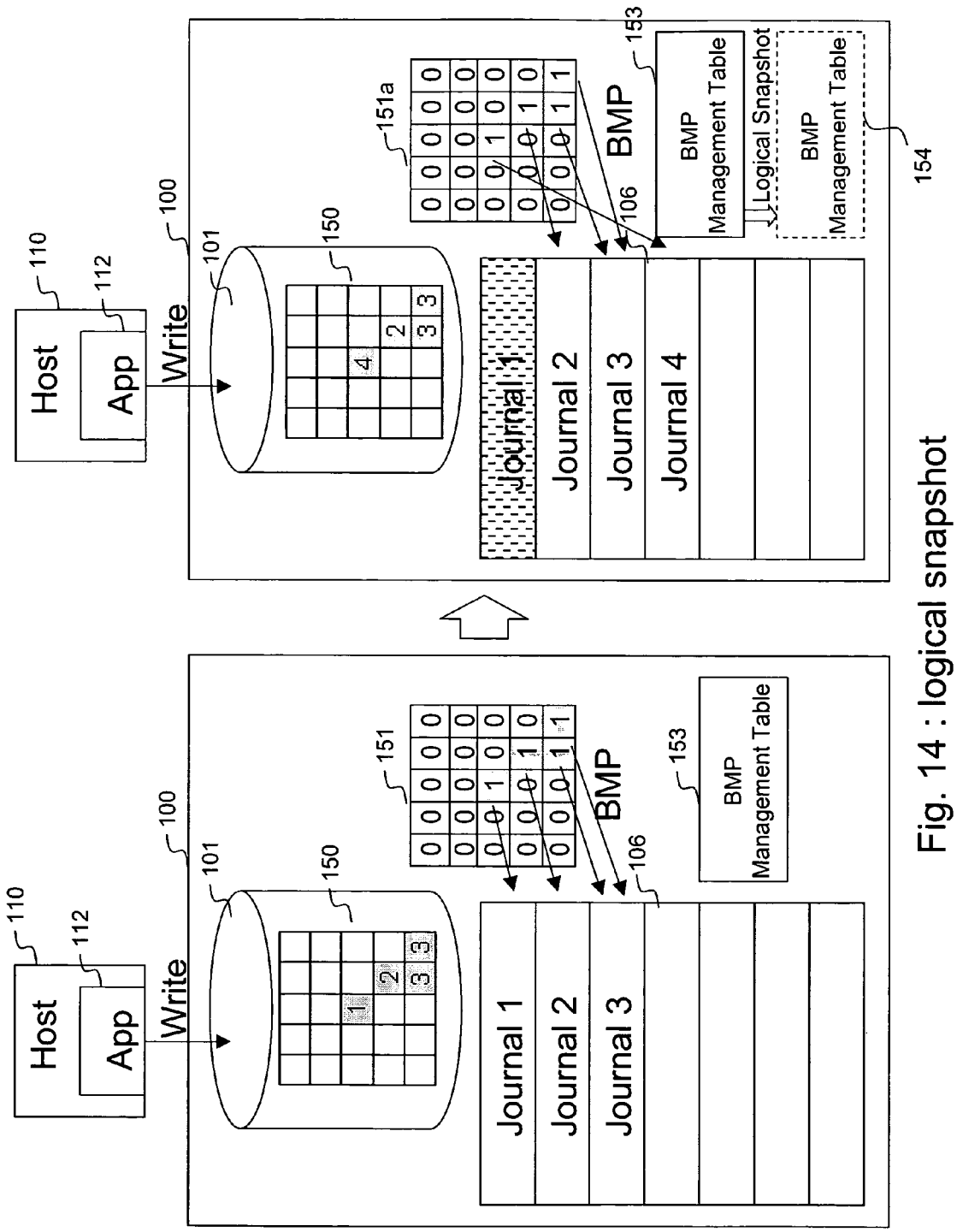
Fig. 14 : logical snapshot

| seq# | DVOL# | bitmap # | JH_SEQ | generation of logical snapshot | time of logical snapshot |
|---|---|---|---|---|---|
| 1 | 0 | 0-1 | 101 (Journal 1) | 0 | - |
| 2 | 0 | 0-2 | 102 (Journal 2) | 0 | - |
| 3 | 0 | 0-3 | 103 (Journal 3) | 0 | - |
| 4 | 0 | 0-4 | 103 (Journal 3) | 0 | - |
| 5 | - | - | - | - | - |

Fig. 15a : BMP Management Table before logical snapshot

| seq# | DVOL# | bitmap # | JH_SEQ | generation of logical snapshot | time of logical snapshot |
|---|---|---|---|---|---|
| 1 | 0 | 0-1 | 101 (Journal 1) | 0 | - |
| 2 | 0 | 1-2 | 102 (Journal 2) | 1 | 03/03/2005 |
| 3 | 0 | 1-3 | 103 (Journal 3) | 1 | 03/03/2005 |
| 4 | 0 | 1-4 | 103 (Journal 3) | 1 | 03/03/2005 |
| 5 | 0 | 1-1 | 104 (Journal 4) | 1 | 03/03/2005 |

Fig. 15b : BMP Management Table after logical snapshot

METHOD AND APPARATUS FOR AVOIDING JOURNAL OVERFLOW ON BACKUP AND RECOVERY SYSTEM USING STORAGE BASED JOURNALING

CROSS-REFERENCES TO RELATED APPLICATIONS

This application is related to the following commonly owned and co-pending U.S. applications:

Application Ser. No. 10/608,391, filed Jun. 26, 2003 entitled "Method and Apparatus for Backup and Recovery System Using Storage Based Journaling," by K. Yamagami; application Ser. No. 10/621,791, filed Jul. 16, 2003 entitled "Method and Apparatus for Data Recovery Using Storage Based Journaling," by K. Yamagami; and application Ser. No. 10/627,507, filed Jul. 25, 2003 entitled "Method and Apparatus for Synchronizing Applications for Data Recovery Using Storage Based Journaling," by K. Yamagami, the contents of each being incorporated herein by reference for all purposes.

BACKGROUND OF THE INVENTION

The present invention relates generally to a backup and recovery system for a storage system, more particularly the present invention relates to a backup and recovery system and method for a storage system that avoids journal overflow.

Several methods are conventionally used to prevent the loss of data. Typically, data is backed up in a periodic manner (e.g. once a day) by a system administrator. Many systems are commercially available which provide backup and recovery of data; e.g., Veritas NetBackup, Legato/Networker, and so on. Another technique is known as volume shadowing. This technique produces a mirror image of data onto a secondary storage system as it is being written to the primary storage system.

Journaling is a backup and restore technique commonly used in database systems. An image of the data to be backed up is taken. Then, as changes are made to the data, a journal of the changes is maintained. Recovery of data is accomplished by applying the journal to an appropriate image to recover data at any point in time. Typical database systems, such as Oracle, can perform journaling.

Except for database systems, however, there are no ways to recover data at any point in time. Even for database systems, applying a journal takes time since the procedure includes:

1) Reading the journal data from storage (e.g., disk),
2) Analyzing the journal to determine where in the journal the desired data can be found, and
3) Applying the journal data to a suitable image of the data to reproduce the activities performed on the data, this usually involves accessing the image, and writing out data as the journal is applied.

Recovering data at any point in time addresses the following types of administrative requirements. For example, a typical request might be, "I deleted a file by mistake at around 10:00 am yesterday. I have to recover the file just before it was deleted."

If the data is not in a database system, this kind of request cannot be conveniently, if at all, serviced. A need therefore exists for processing data in a manner that facilitates recovery of lost data. A need exists for being able to provide data processing that facilitates data recovery in user environments other than in a database application.

In a backup and recovery system using storage based journaling, the storage system must store a large number of journal entries from the processing of numerous write requests. Accordingly, the storage system requires a very large capacity in order to store the large number of journal entries. However, disks, tapes or any other such storage media have an upper limit in capacity. Thus, the storage system can not store a large number of journal entries if the capacity for storing journal entries decrease. Therefore, a need exists for a storage system that avoids journal overflow.

SUMMARY OF THE INVENTION

A storage system provides data storage services for users and their applications. The storage system performs additional data processing to provide for recovery of lost data, including performing snapshot operations and journaling. Snapshots and journal entries are stored separately from the production data volumes provided for the users. Older journal entries are cleared in order to make room for new journal entries. This involves updating a snapshot by applying one or more of the older journal entries to an appropriate snapshot. Subsequent recovery of lost data can be provided by accessing an appropriate snapshot and applying journal entries to the snapshot to reproduce the desired data state.

The present invention provides solutions for avoiding journal overflow in the after journal and before journal methods.

With respect to the after journal method the solutions for avoiding journal overflow according to the present invention include:

(a) Periodically taking a new snapshot and deleting the oldest journal,
(b) Periodically taking a new logical snapshot and deleting the oldest journal,
(c) Stop taking journal entries when the journal volume is full, and
(d) Stop taking journal entries when the journal volume is full and then switching to bitmap management.

With respect to the before journal method the solution for avoiding journal overflow according to the present invention includes:

(a) Apply wrap-around overwriting so as to overwrite the oldest journal entry by the newest journal entry.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 1 is a high level generalized block diagram illustrating a backup and recovery system according to the present invention;

FIG. 2 is a generalized diagram illustrating an embodiment of a data structure for storing journal entries in according to the present invention;

FIG. 3 is a generalized diagram illustrating a first solution to periodically taking a new snapshot and deleting the oldest journal of the after journal method according to the present invention;

FIG. 4 is a generalized diagram illustrating a second solution to periodically taking a new logical snapshot and deleting the oldest journal of the after journal method according to the present invention;

FIG. 5 is a generalized diagram illustrating a third solution to stop taking journal entries when the journal volume is full of the after journal method according to the present invention;

FIG. 6 is a generalized diagram illustrating a fourth solution to stop taking journal entries when the journal volume is full and then switching to bitmap management of the after journal method according to the present invention;

FIG. 7 is a generalized diagram illustrating a solution to apply wrap-around overwriting so as to overwrite the oldest journal entry by the newest journal entry of the before journal method according to the present invention;

FIG. 8 is a generalized diagram illustrating an embodiment of a data structure of a management table of free capacity of the journal for storing information relating to the free capacity of the journal volume(s) according to the present invention;

FIG. 9 is a flowchart illustrating the steps of the first solution to periodically taking a new snapshot and deleting the oldest journal of the after journal method according to the present invention;

FIG. 10 is a flowchart illustrating the steps of the second solution to periodically taking a new logical snapshot and deleting the oldest journal of the after journal method according to the present invention;

FIG. 11 is a flowchart illustrating the steps of the third solution to stop taking journal entries when the journal volume is full of the after journal method according to the present invention;

FIG. 12 is a flowchart illustrating the steps of the fourth solution to stop taking journal entries when the journal volume is full and then switching to bitmap management of the after journal method according to the present invention;

FIG. 13 is a flowchart illustrating the steps of the solution to apply wrap-around overwriting so as to overwrite the oldest journal entry by the newest journal entry of the before journal method according to the present invention;

FIG. 14 is a diagram illustrating the taking of a logical snapshot for plural write requests according to the present invention; and FIGS. 15*a* and *b* are diagrams illustrating the Bitmap Management Table before and after taking a logical snapshot according to the present invention.

DETAILED DESCRIPTION OF THE INVENTION

FIG. 1 is a high level generalized block diagram of an illustrative embodiment of a backup and recovery system according to the present invention. When the system is activated, a snapshot is taken for production data volumes (DVOL) 101. The term "snapshot" in this context conventionally refers to a physical data image of the data volume at a given point in time. Depending on system requirements, implementation, and so on, the snapshot can be of the entire data volume, or some portion or portions of the data volume(s). During the normal course of operation of the system in accordance with the present invention, a journal entry is made for every write operation issued from the host to the data volumes. As will be discussed below, by applying a series of journal entries to an appropriate snapshot, data can be recovered at any point in time.

The backup and recovery system shown in FIG. 1 includes at least one storage system 100. Though not shown, one of ordinary skill can appreciate that the storage system 100 includes suitable processor(s), memory, and control circuitry to perform I/O between a host 110 and its storage media (e.g., disks). The backup and recovery system also requires at least one host 110. A suitable communication path 130 is provided between the host and the storage system 100.

The host 110 typically will have one or more user applications (APP) 112 executing on it. These applications will read and/or write data to storage media contained in the data volumes 101 of storage system 100. Thus, applications 112 and the data volumes 101 represent the target resources to be protected. It can be appreciated that data used by the user applications can be stored in one or more data volumes.

In accordance with the present invention, a journal group (JNLG) 102 is defined. The data volumes 101 are organized into the journal group. In accordance with the present invention, a journal group is the smallest unit of data volumes where journaling of the write operations from the host 110 to the data volumes is guaranteed. The associated journal records the order of write operations from the host to the data volumes in proper sequence. The journal data produced by the journaling activity can be stored in one or more journal volumes (JVOL) 106.

The host 110 also includes a recovery manager (RM) 111. This component provides a high level coordination of the backup and recovery operations. Additional discussion about the recovery manager will be discussed below.

The storage system 100 provides a snapshot (SS) 107 of the data volumes comprising a journal group. For example, the snapshot 107 is representative of the data volumes 101 in the journal group 106 at the point in time that the snapshot was taken. Conventional methods are known for producing the snapshot image. One or more snapshot volumes (SVOL) 105 are provided in the storage system which contains the snapshot data. A snapshot can be contained in one or more snapshot volumes. Though the disclosed embodiment illustrates separate storage components for the journal data and the snapshot data, it can be appreciated that other implementations can provide a single storage component for storing the journal data and the snapshot data.

A management table (MT) 108 is provided to store the information relating to the journal group 102, the snapshot 107, and the journal volume(s) 106. A complete discussion of the details of the management table 108 and its use is provided in the related application Ser. Nos. 10/608,391, 10/621,791 and 10/627,507 identified above and as such the contents of each including the details of the management table 108 and its use are incorporated herein by reference.

A management table of free capacity of the journal (MTFCJ) 120 is provided to store information relating to the free capacity of the journal volume(s). The storage system 100 uses (monitors) this table to trigger various actions including, for example, taking and not taking journals and snapshots so as to avoid journal overflow.

As illustrated in FIG. 8 the management table of free capacity of the journal 120 includes a plurality of entries. These entries, for example, include:

Journal group name 801: This is a listing of the journal group names for each journal group (JNLG-A, JNLG-B and JNLG-C) 102. A user defines this name when the user makes a journal group.

Free capacity of journal pool 802: This is an indication of the amount of free capacity of journal pool that is available for use by the journal group(s). A journal overflow occurs if the free capacity becomes zero (empty).

Threshold of free capacity 803: This is an indication, with respect to each journal group, of the lowest amount of free capacity of the journal pool the storage system is allowed to reach. The storage system 100 according to the present invention, for example, conducts monitoring so as to detect if the free capacity decreases to a level less than the threshold. The setting of this threshold is basically a policy decision as determined by the user. The unit of measurement used to set this threshold can for example be Giga Bytes (GB), Mega Bytes (MB), etc.

Threshold rate of free capacity 804: This is an indication, with respect to each journal group, of the lowest percentage measure of the amount of free capacity to the total amount of capacity of the journal pool the storage system is allowed to reach. The storage system 100 according to the present invention, for example, conducts monitoring so as to detect if the free capacity available for use as a percentage of the journal pool decreases to be less than this threshold. The setting of this threshold is basically a policy decision as determined by the user. The unit of measurement used to set this threshold can for example be a percent (%).

Wrap-around 805: This is an indication, with respect to each journal group, whether the storage system is to overwrite the oldest journal entry by the newest journal entry. The setting of this threshold is basically a policy decision as determined by the user.

A controller component 140 is also provided which coordinates the journaling of write operations and snapshots of the data volumes, and the corresponding movement of data among the different storage components 101, 106, 107. It can be appreciated that the controller component is a logical representation of a physical implementation which may comprise one or more sub-components distributed within the storage system 100.

FIG. 2 shows the data used in an implementation of the journal. When a write request from the host 110 arrives at the storage system 100, a journal is generated in response. The journal comprises a Journal Header 219 and Journal Data 225. The Journal Header 219 contains information about its corresponding Journal Data 225. The Journal Data 225 comprises the data (write data) that is the subject of the write operation. This kind of journal is also referred to as an "AFTER journal."

The Journal Header 219 comprises an offset number (JH_OFS) 211. The offset number identifies a particular data volume 101 in the journal group 102. In this particular implementation, the data volumes are ordered as the $0^{th}$ data volume, the $1^{st}$ data volume, the $2^{nd}$ data volume and so on. The offset numbers might be 0, 1, 2, etc.

A starting address in the data volume (identified by the offset number 211) to which the write data is to be written is stored to a field in the Journal Header 219 to contain an address (JH_ADR) 212. For example, the address can be represented as a block number (LBA, Logical Block Address). A field in the Journal Header 219 stores a data length (JH_LEN) 213, which represents the data length of the write data. Typically it is represented as a number of blocks.

A field in the Journal Header 219 stores the write time (JH_TIME) 214, which represents the time when the write request arrives at the storage system 100. The write time can include the calendar date, hours, minutes, seconds and even milliseconds. This time can be provided by the disk controller 140 or by the host 110. For example, in a mainframe computing environment, two or more mainframe hosts share a timer and can provide the time when a write command is issued.

A sequence number field (JH_SEQ) 215 contains a sequence number which is assigned to each write request. The sequence number is stored in a field in the Journal Header 219. Every sequence number within a given journal group 102 is unique. The sequence number is assigned to a journal entry when it is created.

A journal volume identifier field (JH_JVOL) 216 is also stored in the Journal Header 219. The volume identifier identifies the journal volume 106 associated with the Journal Data 225. The identifier is indicative of the journal volume containing the Journal Data. It is noted that the Journal Data can be stored in a journal volume that is different from the journal volume which contains the Journal Header.

A journal data address field (JH_JADR) 217 stored in the Journal Header 219 contains the beginning address of the Journal Data 225 in the associated journal volume 106 that contains the Journal Data.

A journal type field (JH_TYPE) 218 stored in the Journal Header 219 indicates the journal entry as being an after journal type or a before journal type.

FIG. 2 shows that the journal volume 106 comprises two data areas: a Journal Header Area 210 and a Journal Data Area 220. The Journal Header Area 210 contains only Journal Headers 219, and Journal Data Area 220 contains only Journal Data 225. The Journal Header is a fixed size data structure. A Journal Header is allocated sequentially from the beginning of the Journal Header Area. This sequential organization corresponds to the chronological order of the journal entries. As will be discussed, data is provided that points to the first journal entry in the list, which represents the "oldest" journal entry. It is typically necessary to find the Journal Header 219 for a given sequence number (as stored in the sequence number field 215) or for a given write time (as stored in the time field 214).

As per the above the journal type field (JH_TYPE) 218 contains a journal type indicator which identifies the type of journal entry. In accordance with the present invention, two types of journal entries are kept: (1) an AFTER journal and (2) a BEFORE journal. An AFTER journal entry contains the data that is contained in the write operation for which a journal entry is made. A BEFORE journal entry contains the original data of the area in storage that is the target of a write operation. A BEFORE journal entry therefore represents the contents "before" the write operation is performed.

Journal Header 219 and Journal Data 225 are contained in chronological order in their respective areas in the journal volume 106. Thus, the order in which the Journal Header and the Journal Data are stored in the journal volume is the same order as the assigned sequence number. As will be discussed below, an aspect of the present invention is that the journal information 219, 225 wraps within their respective areas 210, 220.

As per the above in a backup and recovery system using storage based journaling, the storage system must store a large number of journal entries from the processing of numerous write requests. Accordingly, the storage system requires a very large capacity in order to store the large number of journal entries. However, disks, tapes or any other such storage media have an upper limit in capacity. Thus, the storage system can not store a large number of journal entries if the capacity for storing journal entries decrease.

The present invention solves the above noted problem by providing solutions for avoiding journal overflow in the after journal and before journal methods.

With respect to the after journal method the solutions for avoiding journal overflow according to the present invention include:

(a) Periodically taking a new snapshot and deleting the oldest journal (FIGS. 3 and 9), (b) Periodically taking a new logical snapshot and deleting the oldest journal (FIGS. 4 and 10), (c) Stop taking journal entries when the journal volume is full (FIGS. 5 and 11), and (d) Stop taking journal entries when the journal volume is full and then switching to bitmap management (FIGS. 6 and 12).

With respect to the before journal method the solution for avoiding journal overflow according to the present invention includes:

(a) Apply wrap-around overwriting so as to overwrite the oldest journal entry by the newest journal entry (FIGS. 7 and 13).

A descriptions of the above noted solutions are provided below. However, it should be noted that the present invention is not limited to the embodiments described herein, but could extend to other embodiments as would be known or as would become known to those skilled in the art.

After Journal Method

An after journal entry contains data that is contained in the write operation for which a journal entry is made. Thus, the after journal entry keeps the changed data. Therefore, the storage system needs a basic snapshot to which the after journal entries are to be applied in order to restore the data. If the storage system does not have a basic snapshot to which the after journal entries are applied the storage system can not restore the data.

1. First Solution

The first solution of the present invention provided with respect to the after journal method for avoiding journal overflow includes periodically taking a new snapshot and deleting the oldest journal as illustrated in FIGS. 3 and 9.

As per FIG. 3 the present invention provides a data volume DVOL 101 which corresponds to an application. The application when executed, for example, sends write requests (WR) 303 to the DVOL 101 along the time line 304 so as to write data therein. The WRs could for example be formed into sets of WRs 302, each set of WRs 302 corresponding to a single transaction. When each WR 303 is received by the DVOL 101 a corresponding journal entry JNL 305 is made in the volume so as to store an after journal entry in JVOL 106. At each of a plurality of periodically occurring Check points 301 along time line 304 a Snapshot 107a, 107b of the DVOL 106 is taken. A snapshot 107 is stored on one or more SVOLs and represents a point in time copy of the DVOL 106.

The backup and recovery system using storage based journaling can restore the data of each write request. However, an application may not be able to recover the data by using this method of restoring data, because the data of each write may occur at an arbitrary point during the execution of the application. Generally, in order to properly restore data for applications, the recovery should be conducted at a meaningful point such as, for example, the end of a transaction. Such points can be set by the use of check points 301.

As per the flowchart of the present invention as illustrated in FIG. 9, this method requires a trigger to operate in order to take a new snapshot. As per the flowchart of FIG. 9, at initialization a user defines the threshold of free capacity 803 and/or the threshold rate of free capacity 804 in the MTFCJ 120 (Step 901). The controller 140 takes a snapshot 107a (Step 907). An application sends a write request to write data in the DVOL 101 (Step 902). The controller 140 checks the capacity of journal pool (Step 903). If the capacity of journal pool is less than the threshold 803 (804), then the controller 140 takes a new snapshot 107b (Step 904) and deletes the old journal entries (Step 905). Thereafter, a new journal entry is taken (Step 906). If the capacity of journal pool is greater or equal to the threshold 803 (804), then the controller 140 takes a journal entry (Step 906). If desired a user can take a new snapshot manually.

The above described first solution of the after journal method has no performance impact due to journal overflow and does not need to update a snapshot by a journal entry. This solution can store a large number of journal entries due to the frequent taking of snapshots.

2. Second Solution

The second solution of the present invention provided with respect to the after journal method for avoiding journal overflow includes periodically taking a new logical snapshot and deleting the oldest journal as illustrated in FIGS. 4 and 10.

As per FIG. 4 the present invention provides features similar to those illustrated in FIG. 3 with the exception of a logical snapshot 401 being taken at the check points 301. Thus, according to the present invention the controller 140 periodically takes a logical snapshot 401 instead of a snapshot 107.

A logical snapshot 401 is a type of snapshot that represents the changes to the data as represented by, for example, a bitmap. Accordingly, a logical snapshot is a virtual entity since no physical copy of the volume exists. Thus, according to the present invention before taking a journal entry, the controller 140 makes a difference bitmap (not shown) to be used for a logical snapshot 401. In the bitmap each bit shows the update status of a data area (5 12 KB, 1 024 KB etc) of DVOL 101. The controller 140 has the latest journal information (JH_SEQ 215) corresponding to the updated bit. If the controller 140 takes a logical snapshot 401, then the controller 104 deletes the oldest journal entry with the exception of the newest journal entry corresponding to updated bit. Therefore, the logical snapshot represents the latest journal entries corresponding to an updated bit.

An explanation of a logical snapshot is illustrated in FIG. 14. As per FIG. 14 the DVOL 101 is divided into a plurality of data areas 150 each being of a pre-set size (512 KB, 1024 KB etc). A differential bitmap (BMP) 151 is provided for each DVOL 101, wherein each bit of the differential BMP corresponds to one of the data areas so as to indicate whether the corresponding data area has changed or not. A "1" indicates a change, whereas a "0" indicates no change. A BMP Management Table 153 is provided indicating relations among BMP 151, journal entries and DVOL 101. FIG. 14 illustrates on the left side of the figure the status of the data areas 150 and the bits of the BMP 151 upon the occurrence of write requests 1, 2, and 3. FIG. 14 also illustrates on the right side of the figure the status of the data areas 150 and the bits of the BMP 151a upon the occurrence of write request 4 after conducting write requests 1, 2, and 3. Thus, according to the resent invention the right side of FIG. 14 illustrates that the storage system took a logical snapshot when write request 4 reached the DVOL 101, thereby forming BMP Management Table 153.

FIGS. 15a and 15b illustrate the status of the BMP Management Table before the logical snapshot is taken and after the logical snapshot is taken, respectively. The BMP Management Table includes a plurality of entries each having the fields seq# 1401 indicating a sequential number of BMP Management Table entry based on JH_TIME 214 or JH_SEQ 215 also forming part of each entry, DVOL# 1402 indicating a unique DVOL number assigned to DVOL 101 in Journal Group 102, 1403 bitmap# indicating parameters A-B, where A is the version/generation of the logical snapshot and B is data area number, 1404 indicating a version/generation of the logical snapshot, and 1405 indicating a time logical snapshot was taken.

According to the present invention BMP Management Table 153 corresponds to FIG. 15a, whereas BMP Management Table 154 corresponds to FIG. 15b. Thu, as described above FIG. 15a is a BMP Management Table before taking a logical snapshot, whereas FIG. 15b is a BMP Management Table after taking a logical snapshot.

A logical snapshot of any version/generation does not reference Journal 1 in FIG. 15b since the data area corresponding to Journal 1 was written by write request 4. Therefore storage system can delete Journal 1 when the storage system takes a logical snapshot. Accordingly, the storage system can delete any non-reference journals.

Another way of describing the above is, the logical snapshot means a group of journals which have the same generation and max sequence number as per the BMP Management Table 153 for each of the data areas 150. The storage system 100 can delete journals which do not have a max sequence number of the BMP Management Table 153 for each of the data areas 150 at the time of generation of the logical snapshot. Journals which do not have max sequence number of BMP Management Table 153 for each of the data areas means non-reference journals.

As per the flowchart of the present invention as illustrated in FIG. 10, this method requires a trigger to operate in order to take a logical snapshot. As per the flowchart of FIG. 10, at initialization a user defines the threshold of free capacity 803 and/or the threshold rate of free capacity 804 in the MTFCJ 120 (Step 1001). The controller 140 takes a snapshot 107 or takes a bit map for a logical snapshot 401 (Step 1007). An application sends a write request to write data in the DVOL 101 (Step 1002). The controller 140 checks the capacity of journal pool (Step 1003). If the capacity of journal pool is less than the threshold 803 (804), then the controller 140 takes a snapshot 107 or takes a bitmap for a logical snapshot 401 (Step 1004) and deletes the old journal entry (Step 1005). Thereafter, a new journal entry is taken (Step 1006). If the capacity of the journal pool is greater than or equal to the threshold 803 (804), then the controller 140 takes a journal entry (Step 1006). If desired a user can take a new snapshot manually.

3. Third Solution

The third solution of the present invention provided with respect to the after journal method for avoiding journal overflow includes stop taking journal entries when the journal volume is full as illustrated in FIGS. 5 and 11.

As per FIG. 5 the present invention provides features similar to those illustrated in FIGS. 3 and 4 with the exception that a snapshot 107 will be taken and journal entries 305 made until the JVOL 106 becomes full. When the JVOL 106 becomes full the present invention stops taking journal entries 305 before the JVOL 106 overflows.

As per the flowchart of the present invention as illustrated in FIG. 11, this method requires a trigger to stop taking journal entries 305. Thus, as per the flowchart of FIG. 11 at, for example, initialization a user defines the threshold of free capacity 803 and/or the threshold rate of free capacity 804 in the MTFCJ 120 (Step 1101). The controller 140 takes a snapshot (Step 1006). An application sends a write request to write data in the DVOL 101 (Step 1102). The controller 140 checks the capacity of journal pool (Step 1103). If the capacity of journal pool is less than the threshold 803, then the controller 140 stops taking journal entries (Step 1104). If the capacity of journal pool is greater than or equal to the threshold 803 (804), then the controller 140 takes journal entry (Step 1105). If desired a user can stop taking journal entries manually.

4. Fourth Solution

The fourth solution of the present invention provided with respect to the after journal method for avoiding journal overflow includes stop taking journal entries when the journal volume is full and then switching to bitmap management as illustrated in FIGS. 6 and 12.

As per FIG. 6 the present invention provides features similar to those illustrated in FIGS. 3, 4 and 5 with the exception that a snapshot 107 will be taken and journal entries 305 are made until the JVOL 106 becomes full. When the JVOL 106 becomes full the present invention stops taking journal entries 305 before the JVOL 106 overflows and then switches to bitmap management.

As per the flowchart of the present invention as illustrated in FIG. 12, this method requires a trigger to stop taking journal entries 305. Thus, as per the flowchart of FIG. 12 at, for example, initialization a user defines the threshold of free capacity 803 and/or the threshold rate of free capacity 804 in the MTFCJ 120 (Step 1201). The controller 140 takes a snapshot 107 (Step 1209). An application sends a write request to write data in the DVOL 101 (Step 1202). The controller 140 checks the capacity of journal pool (Step 1203). If the capacity of the journal pool is less than the threshold 803 (804), then the controller 140 stops taking journal entries (Step 1204). Thereafter, the controller switches to bitmap management which tracks a difference using a bitmap 601 (Step 1205). If the user adds capacity to the journal pool (Step 1206) such as by adding disks, then the controller 140 can take a logical snapshot 401 and take a journal for a logical snapshot 401 (Step 1207). As known the logical snap shot requires less storage capacity than a snapshot. The operation of the controller 140 then returns to Step 1202. If the capacity of journal pool is greater than or equal to the threshold 803 (804), then the controller 140 takes a journal entry (Step 1208). If desired a user can stop taking journal entries manually.

Before Journal Method

A before journal entry contains the original data of the area in storage that is the target of a write operation. A before journal entry therefore represents the contents "before" the write operation is performed. Therefore, the storage system does not need a basic snapshot to which the after journal entries are to be applied in order to restore the data. If the storage system does not have the DVOL 101 to which the before journal entries are applied the storage system can not restore the data.

1. Solution

The solution of the present invention provided with respect to the before journal method for avoiding journal overflow includes applying wrap-around overwriting so as to overwrite the oldest journal entry by the newest journal entry as illustrated in FIGS. 7 and 13.

As per FIG. 7 the present invention provides a data volume DVOL 101 which corresponds to an application and a journal volume 106 which stores before journal entries. The application when executed, for example, sends write requests (WR) 303 to the DVOL 101 along the time line 304 so as to write data therein. The WRs could for example be formed into sets of WRs 302, each set of WRs 302 corresponding to a single transaction. When each WR 303 is received by the DVOL 101 a corresponding journal entry BJNL 701 is made and is stored as a before journal entry in JVOL 106. A plurality of periodically occurring check points 301 can be provided along time line 304.

The backup and recovery system using storage based journaling can restore the data of each write request. However, an application may not be able to recover the data by using this method of restoring data, because the data of each write may occur at an arbitrary point during the execution of the application. Generally, in order to properly restore data for applications, the recovery should be conducted at a meaningful point such as, for example, the end of a transaction. Such points can be set by the use of the check points 301. As per the flowchart of the present invention as illustrated in FIG. 13, the user sets whether the overwrite method 805 is to be used in the MTFCJ 120 and sets the threshold of free capacity 803 and/or the threshold rate of free capacity 804 in the MTFCJ 120 (Step 1301). An application sends a write request to write data in the DVOL 101 (Step 1302). The controller 140 checks the capacity of journal pool (Step 1303). If the capacity of journal pool is less than the threshold 803 (804), then the controller 140 overwrites the oldest journal entry in the JVOL 106 (Step 1304). The controller 140 can find the oldest journal entry by using JH_SEQ 215. Thereafter the operation of the controller proceeds to Step 1302. If the capacity of journal pool is greater than or equal to the threshold 803 (804), then the controller 140 takes a journal entry (Step 1305).

As per the above the present invention provides a method and apparatus having various solutions for avoiding journal overflow in after and before journal methods of a backup and recovery system used with a storage system. The after journal method solutions, which are conducted when the amount of free space reaches a threshold, include periodically taking a new snapshot and deleting the oldest journal, periodically taking a new logical snapshot and deleting the oldest journal, stopping the taking of journal entries when the journal volume is full, and stopping the taking of journal entries when the journal volume is full and then switching to bitmap management. The before journal method solution, which is conducted when the amount of free space reaches a threshold, includes applying wrap-around overwriting to overwrite the oldest journal entry by the newest journal entry.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A backup and recovery method for a storage system that avoids journal overflow, the method comprising:
producing at least a first snapshot of a data volume, said data volume being configured to receive data by way of write operations issued from a host device;
producing a journal entry for each write operation issued from the host device;
storing each journal entry in a journal volume, thereby accumulating a list of journal entries;
monitoring an amount of free space on the journal volume upon receiving a write operation;
stopping the storing of journal entries when the free space falls below a threshold value, thereby avoiding journal overflow, wherein said threshold value includes a first indication of a lowest amount of the free space of capacity of the journal volume;
switching to bitmap management by using a bitmap representation of storage areas in the data volume to track the storage areas in the data volume to which the write operations are directed until additional capacity is provided for the journal volume; and
storing a new journal entry in the journal volume following adding of capacity by taking a logical snapshot, wherein taking a logical snapshot includes deleting any stored journal entries corresponding in the bitmap to the new journal entry.

2. A backup and recovery method according to claim 1, wherein when the storing of journal entries has been stopped to prevent journal overflow and control is switched to bitmap management, said method further comprising:
adding capacity to said journal volume by adding more storage media for use in storing journal entries.

3. A backup and recovery method according to claim 1, wherein said threshold value is set in a management table which includes a plurality of entries each containing information of respective journal volumes.

4. A backup and recovery method according to claim 3, wherein one of said entries of said management table includes an indication of the size of a journal pool which includes said journal volume.

5. A backup and recovery method according to claim 4, wherein said threshold value includes a second indication of a lowest percentage measure of an amount of free space to a total amount of capacity of the journal pool that the storage system is allowed to fall below.

6. A backup and recovery method for a storage system that avoids journal overflow, the method comprising:
providing a journal pool for storage of journal entries, said journal pool having a storage capacity;
producing a first snapshot of a data volume, said data volume being configured to receive data by way of write operations issued from a host device, said snapshot being a copy of data of said data volume at a point in time;
monitoring an amount of free space in the journal pool upon receiving a write operation;
storing a journal entry in the journal pool for each write operation directed to said data volume if the free space in the journal pool is not less than a threshold value, wherein the threshold value is an indication of a lowest amount of free space of capacity of the journal pool to allow the storage system to fall below;
stopping the storing of journal entries in the journal pool when the free space in the journal pool falls below the threshold value, thereby avoiding overflow of the journal pool;
switching to bitmap management upon the stopping of the storing of the journal entries, wherein changes to the data stored on the data volume are represented by a bitmap, and a condition of each bit of the bitmap indicates whether a change has been made to a corresponding storage area of the data volume; and
storing a new journal entry in the journal pool following adding of capacity by taking a logical snapshot that includes deleting any stored journal entries corresponding in the bitmap to the new journal entry.

7. A backup and recovery method according to claim 6, further including adding capacity to said journal pool following the stopping of the storing of journal entries by allocating additional storage media to said journal pool.

8. A backup and recovery method according to claim 6, wherein said threshold value is set in a management table that includes a plurality of entries, each containing information of journal volumes in said journal pool.

9. A backup and recovery method according to claim 8, wherein one of said entries of said management table includes an indication of the capacity of the journal pool.

10. A backup and recovery method according to claim 6, wherein said threshold value is an indication of a lowest percentage measure of the amount of free space to a total amount of capacity of the journal pool that is allowable.

11. A backup and recovery method for a storage system that avoids journal overflow in said storage system, the method comprising:
   providing a journal pool for storage of journal entries, said journal pool having a storage capacity;
   defining a threshold value of available capacity for the journal pool;
   taking a first snapshot by a controller in the storage system, said snapshot being a copy of a data volume, said data volume being configured to receive data by way of write requests issued from a host computer;
   checking available capacity of the journal pool by the controller when a write request is received;
   storing journal entries in the journal pool if the available capacity of the journal pool is not below the threshold value, wherein said threshold value is an indication of the lowest amount of available capacity of the journal pool to allow the storage system to fall below;
   stopping the storing of the journal entries by the controller if the available capacity of the journal pool is less than the threshold value to avoid the journal pool overflow;
   switching to bitmap management by the controller upon the stopping the storing of the journal entries, wherein the bitmap management tracks changes to the data in the data volume using a bitmap that represents storage areas in the data volume to keep track of the storage areas in the data volume to which new write operations are directed until additional capacity is provided for the journal pool;
   adding capacity to the journal pool by adding disks to the storage system;
   taking a logical snapshot and making a new journal entry for the logical snapshot;
   returning operation of the controller to store subsequent journal entries in the journal pool so long as the available capacity of the journal pool is not less than the threshold value.

12. A backup and recovery method according to claim 11, wherein taking a logical snapshot includes deleting any stored journal entries corresponding in the bitmap to the new journal entry.

13. A backup and recovery method according to claim 11, wherein said threshold value is set in a management table that includes a plurality of entries, each containing information of journal volumes in said journal pool.

14. A backup and recovery method according to claim 13, wherein one of said entries of said management table includes an indication of the capacity of said journal pool.

15. A backup and recovery method according to claim 14, wherein said threshold value is an indication of a lowest percentage measure of the amount of available capacity to a total amount of capacity of the journal pool that is allowable.

* * * * *